(12) United States Patent
Clelland et al.

(10) Patent No.: US 7,415,415 B2
(45) Date of Patent: Aug. 19, 2008

(54) COMPUTER GENERATED PROMPTING

(75) Inventors: George Murdoch Clelland, Alresford (GB); John Brian Pickering, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 10/919,683

(22) Filed: Aug. 17, 2004

(65) Prior Publication Data

US 2005/0131684 A1 Jun. 16, 2005

(30) Foreign Application Priority Data

Dec. 12, 2003 (GB) .................. 0328793.5

(51) Int. Cl.
*G10L 15/00* (2006.01)
*G10L 15/22* (2006.01)
*H04M 11/00* (2006.01)

(52) U.S. Cl. ............... 704/270.1; 704/251; 704/270; 704/275; 379/88.01; 379/88.04

(58) Field of Classification Search .......... 704/251, 704/270, 270.1, 275; 379/88.01, 88.04
See application file for complete search history.

(56) References Cited

U.S. PATENT DOCUMENTS

| | | | | |
|---|---|---|---|---|
| 5,454,063 A | * | 9/1995 | Rossides | 704/275 |
| 5,612,869 A | * | 3/1997 | Letzt et al. | 704/251 |
| 5,820,384 A | * | 10/1998 | Tubman et al. | 434/308 |
| 6,144,938 A | * | 11/2000 | Surace et al. | 704/257 |
| 6,173,266 B1 | * | 1/2001 | Marx et al. | 704/270 |
| 6,404,876 B1 | * | 6/2002 | Smith et al. | 379/88.01 |
| 6,510,411 B1 | * | 1/2003 | Norton et al. | 704/254 |
| 6,601,029 B1 | * | 7/2003 | Pickering | 704/257 |
| 2002/0059072 A1 | * | 5/2002 | Quibria et al. | 704/270 |
| 2003/0191648 A1 | | 10/2003 | Knott et al. | |
| 2003/0200080 A1 | * | 10/2003 | Galanes et al. | 704/200 |
| 2004/0098253 A1 | | 5/2004 | Balentine et al. | |

FOREIGN PATENT DOCUMENTS

| | | | |
|---|---|---|---|
| JP | 03041499 A | * | 2/1991 |
| WO | WO 02/052546 | | 7/2002 |
| WO | WO 02/060162 | | 8/2002 |

* cited by examiner

*Primary Examiner*—Patrick N. Edouard
*Assistant Examiner*—James S. Wozniak
(74) *Attorney, Agent, or Firm*—Akerman Senterfitt

(57) ABSTRACT

A method and apparatus for generating appropriate confirmatory prompts in a speech-enabled, interactive computer system. The method can be incorporated in an interactive voice response system that includes receiving an input audio stream over a voice channel from a users, performing keyword recognition on received input audio as subsequent input audio is being received, and prompting the user with an acknowledgement of the keyword or keywords as subsequent input audio is being received. In another aspect of the method, the volume of the speech input can be continuously monitored. In a further aspect of the method, recognition results and associated confidence values can be combined to select different confirmatory prompts, and the volume is tailored to be the same as, louder than or quieter than the volume of the speech input, so that different types of confirmation can be automatically generated to produce a natural speech-enabled interface.

10 Claims, 4 Drawing Sheets

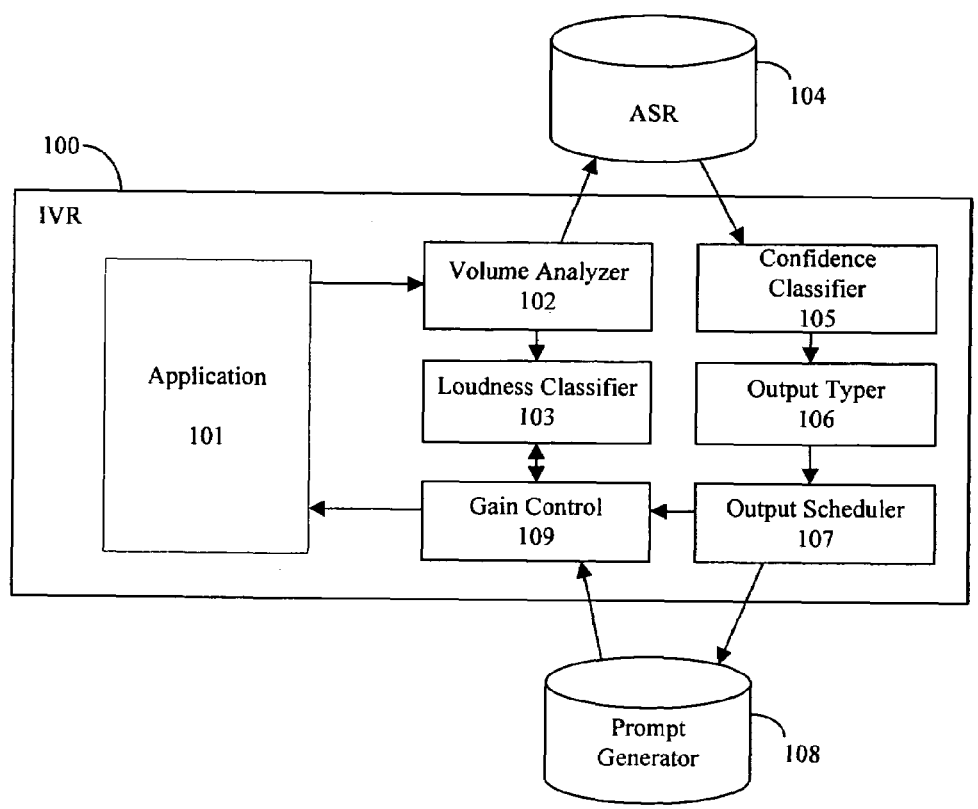
"I'd like to fly from London To New York on the 31st of May please"
FIG. 1

| Process Step | Component | Input | Output |
|---|---|---|---|
| 201 | Volume Analyzer 102 | Input Audio 300 | Input Audio 300 |
| 202 | Volume Analyzer 102 | Input Audio 300 | Input Audio 300 |
| 203 | Volume Analyzer 102 | Input Audio 300 | Current Volume 302 |
| 203 | Loudness Classifier 103 | Current Volume 302 | Volume Control 304 |
| 204 | ASR 104 | Input Audio 300 + Grammar Definition File 306 | Keyword 308 + Confidence Value 310 |
| 205 | Confidence Classifier 105 | Confidence Value 310 | Confidence Category Tag 312 |
| 206 | Output Typer 106 | Keyword 308 + Confidence Category Tag 312 | Prompt 314 |
| 207 | Output Scheduler 107 | Keyword 308, Confidence Category Tag 312, Prompt 314 | Alert 316 |
| 208 | Prompt Generator 108 | Alert 316, Keyword 308, Prompt 314 | Output Audio 318 |
| 209 | Gain Control 109 | Volume Control 304, Output Audio 318 | Modified Output Audio 320 |

FIG. 3

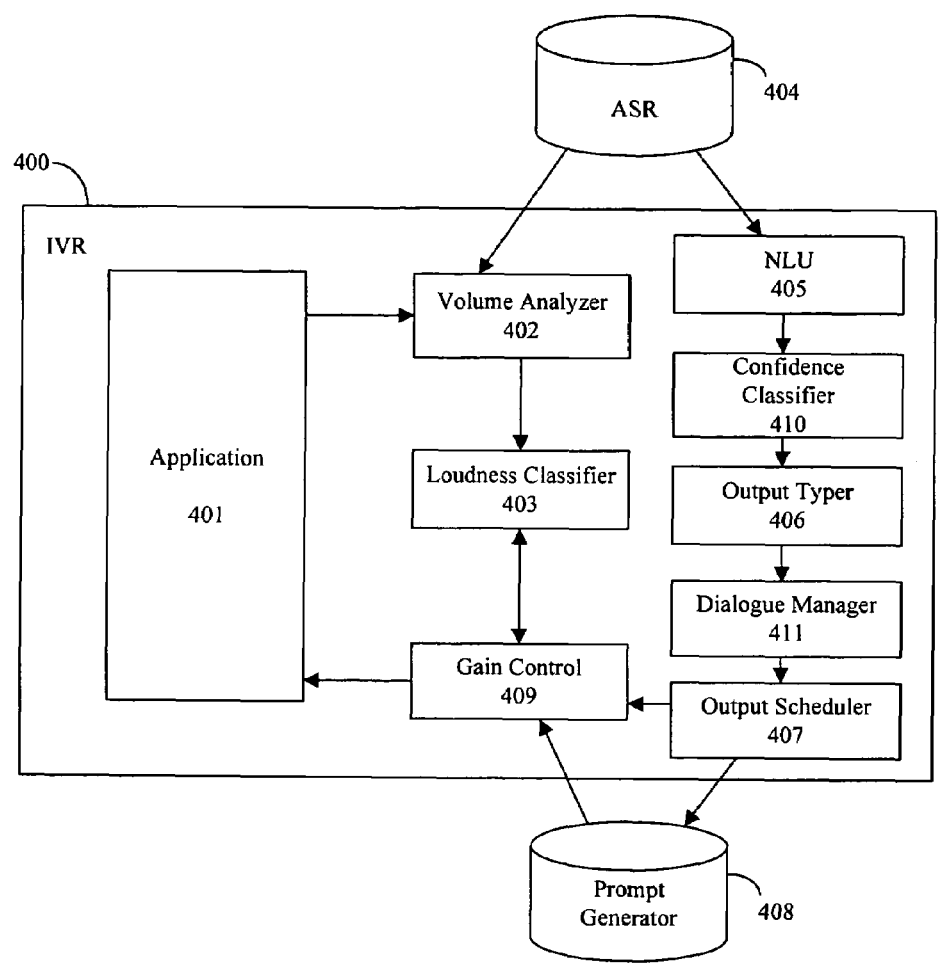
"I'd like to fly from London To New York on the 31st of May please"
FIG. 4

COMPUTER GENERATED PROMPTING

CROSS-REFERENCE TO RELATED APPLICATIONS

This application claims the benefit of British Patent Application No. 0328793.5, filed Dec. 12, 2003.

FIELD OF INVENTION

This invention relates to the automatic generation of confirmatory prompts in an interactive computer system. In particular, it relates to a method and apparatus for managing user-friendly confirmatory prompts in an interactive voice response system (IVR).

BACKGROUND OF THE INVENTION

A typical automated interaction between a user and a speech-enabled IVR involves the user inputting information using a speech interface and the IVR reacting to the input to complete a business transaction. Such transactions may include requesting travel information or making a booking or financial transfer.

In a known IVR method, after the user inputs information, the IVR application confirms the input by echoing it back to the user and asking the user to say "yes" or "no", or to press an appropriate DTMF key.

This method guarantees success from the viewpoint of the automated computer system. However, the method can lead to frustration for the user and increase the time and the cost to complete the transaction. When a user talks to a live agent, something different occurs. The agent confirms at certain points during the user input that he understands and only asks for explicit confirmation from the user in difficult cases. Therefore the transaction is completed quicker and more efficiently than with the known IVR method.

DISCLOSURE OF THE INVENTION

A first aspect of the invention can include a method of providing acknowledgement prompts in an interactive voice response system includes receiving an input audio stream over a voice channel from a user. Keyword recognition is performed on received elements of the input audio stream. The user is prompted with an acknowledgement of recognized received elements whilst continuing to receive the input audio stream.

A second aspect of the invention can provide an interactive voice response system for providing acknowledgement prompts. The system includes means for receiving an input audio stream over a voice channel from a user. Means for performing keyword recognition on received elements of the input audio stream is also included. The system further includes means for prompting the user with an acknowledgement of recognized received elements whilst continuing to receive the input audio stream.

A third aspect of the invention can include a computer program product providing acknowledgement prompts in an interactive voice response system. The computer program product includes computer program instructions stored on a computer-readable storage medium. The computer program instructions, when loaded into an interactive voice response system (IVR) and executed, cause the IVR to carry out the steps of receiving an input audio stream over a voice channel from a user, performing keyword recognition on received element of the input audio stream, and prompting the user with an acknowledgement of recognized elements of the input audio stream whilst continuing to receive further elements of the input audio stream.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

In order to promote a fuller understanding of this and other aspects of the present invention, a preferred and alternative embodiment of the invention will now be described by means of example only, with reference to the accompanying drawings in which:

FIG. 1 is a schematic overview of the preferred embodiment of the invention;

FIG. 3 is a tabular view of the detailed steps involved in FIG. 2; and

FIG. 4 is a schematic overview of an alternative embodiment of the invention.

DESCRIPTION OF THE PREFERRED EMBODIMENTS

Figure 2:
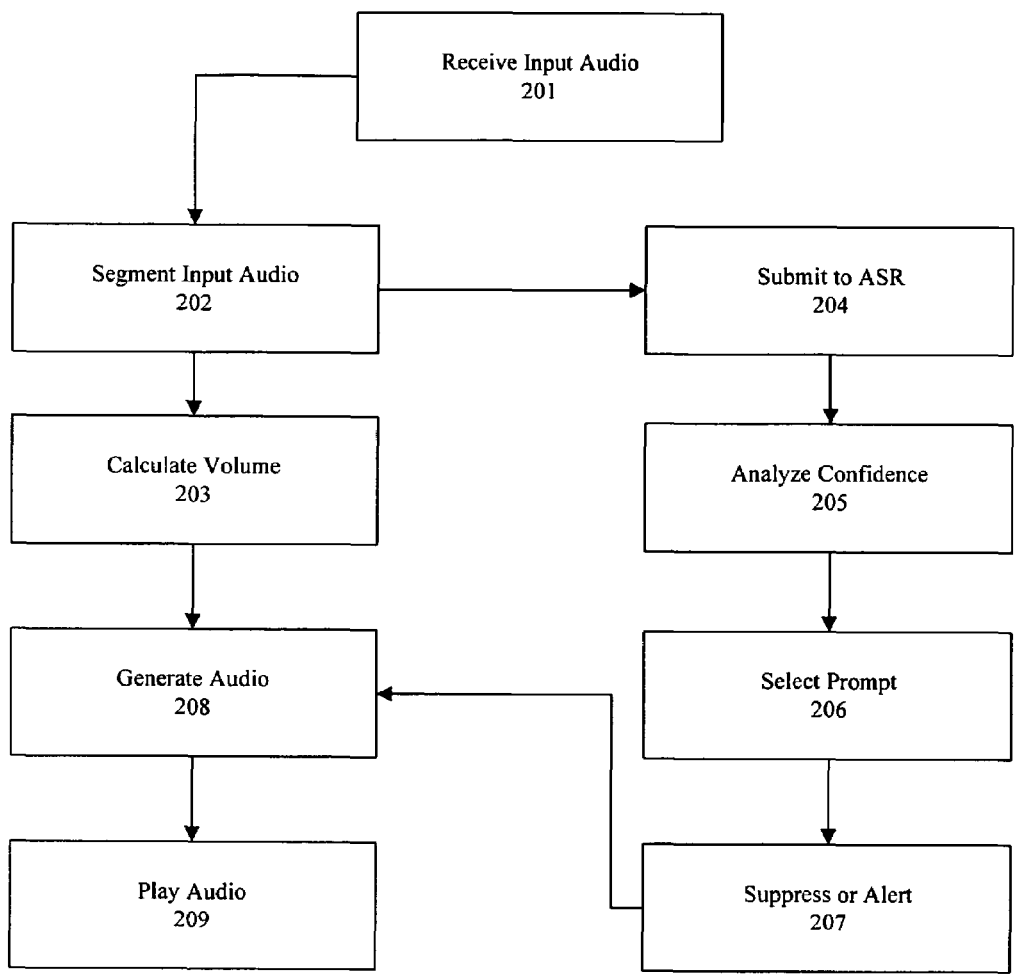
FIG. 2 is a schematic flow diagram of the steps involved in the preferred embodiment of the invention.

By way of illustration, FIG. 1 shows a presently preferred embodiment. An interactive voice response system (IVR) 100 connects to a telephony environment via a standard telephony interface (not shown), an automatic speech recognition system (ASR) 104 and a prompt generator 108. The IVR 100 comprises: an application 101; volume analyzer 102; loudness classifier 103; confidence classifier 105; output typer 106; output scheduler 107; and gain control 109. The application 101 controls the interaction between the IVR 100 and the user to complete a service function. An input part of the interaction plays out request, acknowledgement and confirmatory prompts as required and receives audio input from the user. The service function in this case is a flight booking service, although the invention is not limited in this regard. The user input is converted to a text result by the ASR 104; the service function processes the text result and returns with a confirmation that a booking has been made. Further input interactions may be required such as acquiring payments and address details and these further interactions can be performed in the same way as the former user input. The output interaction is by way of a confirmation to signal completion of the interaction. When the user talks to the IVR 100 input audio is received by the application 101 and passed via the volume analyzer 102 to the ASR 104. The volume analyzer 102 tracks the input audio volume on an ongoing basis, for instance every 250 to 500 msec, and returns the current volume of the input audio. This value is passed to the loudness classifier 103. The loudness classifier 103 compares the value passed from the volume analyzer 102 with a previous value. If the current value is greater than the previous value, then the loudness classifier 103 overwrites the previous volume with the current value.

The loudness classifier 103 can produce three volume values which are stored: loud (which is greater than the current input volume); neutral (which matches the current input volume); and quiet (which is significantly below the current volume). These values will be queried by the gain control 109 as described below.

The ASR 104 processes the input audio signal to convert it to a text result with an associated confidence value. To do this, it can use a grammar definition file defining keywords as the words and phrases used by the automated service. When a keyword is located in the input audio signal an associated keyword tag can be inserted into the text result. Some keyword tags in the grammar definition are marked as optional. Furthermore, when the ASR 104 inserts a keyword tag into the text result it also inserts an associated confidence tag representing the confidence value given to the keyword recognition by the ASR 104. The ASR 104 returns text results during the user input as they are determined; in the preferred embodiment the text results are returned as soon as a keyword is located. The ASR 104 uses the grammar definition file to match keywords; an extract of an example grammar definition file follows:

```
<intro> = (I'd like to fly) | (I'd like to go) | (I want to fly) | (I want to go)
<outro> = (Please) | (Thank you) | (Thanks)
<FROM> = ({London} | Birmingham | Bournemouth | East Midlands |
Edinburgh | Glasgow)
London = (London) | (London) Heathrow | (London) Gatwick | (London)
Stanstead | (London) Luton (Airport) )
<TO> = (New York | LA | Los Angeles | San Francisco | Chicago |
Miami )
<DATE> = ( (on) (the) {ORDINAL} (of) {MONTH})
<ORDINAL> = ( first | second | . . . thirty-first)
<MONTH> = (January | February | . . . | December).
```

Angled bracket items are keyword category tags and the words that follow are keywords in that category. Curved bracket items are optional keywords; items between braces are further defined (e.g. {London}). Such a grammar caters for compound input phrases with different combinations of keywords, example phrases include:
 1. "I'd like to fly from London to New York on the 31st of May please"; or
 2. "I want to fly to LA from London Gatwick thanks".

A simple text result structure will look like this: "<intro>=keyword <FROM>=keyword <TO>=keyword <DATE>=keyword <outro>=keyword" where the keyword is a string inside quotation marks as located in the grammar definition file.

The ASR 104 returns a text result after a keyword is identified, in the first example input phrase, the first text result would appear as <intro>="I'd like to fly" <optional> <confidence>=x % where the associated confidence value tag indicates a confidence value of x % where x is in the range 0 to 100.

The confidence value tag is passed to the confidence classifier 105 that generates a confidence category tag on the following basis: for confidence values below 45%, the result is deemed in error and is given an <incorrect> tag; for confidence values above 85%, the result is deemed correct and given a <correct> tag; and for confidence values between 45 and 85%, the result is deemed ambiguous and given an <ambiguous> tag. A confidence category tag can be inserted into the text result after the confidence value tag. For example, if the confidence value of the previous example was 50% then the first part of the text result would look like: "<intro>="I'd like to fly" <optional> <confidence>=50% <ambiguous>". The text result including the confidence category tag is passed to the output typer 106.

The output typer 106 assigns a prompt associated with the confidence categories as follows: a <correct> tag is associated with "place-marker" prompts; an <ambiguous> tag is associated with an "optional turn-take" prompt; and an <incorrect> tag is associated with a "definite turn-take" prompt. The "place-marker" prompts can include: "uhuh"; "ok"; "right"; "all right"; "fine" ; and "got that". The "optional turn-take" prompts can include: "ok" plus the identified keyword; or "all right" plus the identified keyword. The "definite turn-take" prompt can include: "sorry, was that" plus the identified keyword; or "sorry, I didn't quite catch that, could you repeat that" with no identified keyword. The prompts are not limited to those described, and any suitable prompt can be used in each instance.

If a confidence category tag is identified by the output typer 106, then both a prompt and the confidence category tag is sent to the output scheduler 107. If the <correct> tag is identified, then a "place marker" prompt can be sent to the output scheduler 107. This identifies to the user that keyword information has been received for processing by the automated service. Alternatives from the list of "place marker" prompts can be selected randomly or on a round-robin basis. If the <ambiguous> tag is identified in the text result, then an "optional turn-take" prompt plus a keyword can be sent to the output scheduler 107. This tells the user that some information has been received and allows the user to correct if desired. Alternatives from the "optional turn-take" prompts can be selected randomly or on a round-robin basis. The relative position of the prompt and the keyword are swapped alternately by the output scheduler 107.

If the <incorrect> tag is identified in the text result, then one of the "definite turn-take" prompts plus the identified keyword can be sent to the output scheduler 107. Alternatives from the "definite turn-take" list can be selected randomly or on a round-robin basis. In the case of a repeated misrecognition, the second and subsequent prompt types are automatically upgraded to "definite turn-take". After a prompt and keyword have been identified by the output typer 106, the output scheduler 107 decides if the prompt is to be played to the caller. The output scheduler 107 first looks at the confidence category tag and keeps a record of the categories already used in the current instance of the application. If the previous and current confidence category tags are identical, then the output scheduler will suppress alternate "place-marker" prompts for successive <correct> tags and no prompt will be played to the user. For successive <ambiguous> tags the output scheduler 107 signals to the application 101 that the user is having difficulties and a separate sub-dialogue is invoked. The separate sub-dialogue breaks the dialogue into a menu of single step prompts.

If the output scheduler 107 does not suppress the prompt, then the prompt and keyword are sent to the prompt generator 108 to be played out to the user. At the same time the confidence category tag is sent to the gain control 109.

The output scheduler 107 sends the confidence category tag to the gain control 109, so that the gain control 109 can query the loudness classifier 103 and modify the output audio if required.

The prompt generator 108 may either access a complete set of pre-recorded audio samples representing all possible prompt plus keyword strings or can invoke a text-to-speech synthesizer to render the prompt plus keyword into audio output. The audio output is sent to the gain control 109. The gain control 109, using the loudness values from the loudness classifier 103 and the confidence type tag from the output scheduler 107 (<correct>, <ambiguous> or <incorrect>) can adjust the output audio volume from the loudness classifier 103. The audio output volume for an <incorrect> confidence type tag can be modified to be loud, that is the default value of the audio output volume is increased by a small amount, typically by 10%. The audio output volume for an <ambiguous> confidence category tag can be modified to be neutral and so not modified, or decreased by as much as 25%. The audio output volume for a <correct> confidence category tag can be modified substantially, for instance, the audio output volume is decreased by up to 50%.

The application 101 receives the modified audio output and plays it to the user.

The text result will eventually include a sequence of keywords and keyword identifiers including some apparent repetitions. Each keyword and identifier tag will be followed by a confidence value tag and a confidence category tag; all keywords and identifiers except those with <correct> tags can be rejected. The application sorts through the keywords and chooses those associated with the highest confidence values or confidence categories. Subsequent repeat keywords in the sequence will normally have <correct> tags and therefore supersede previous repeat keywords which would have <ambiguous> or <incorrect> tags. But ultimately it is the confidence category tag that determines rejection and not the position in the text result. For instance an initial keyword with an <ambiguous> tag will take precedence over a subsequent keyword with an <incorrect> tag although the automated service will attempt to acquire a more accurate result this sometimes will not happen.

FIG. 2 is a schematic flow diagram of the process steps involved in the preferred embodiment described below with reference to the components of FIG. 1 and the table of FIG. 3. FIG. 3 shows the input and output to the components performing process steps 201 to 209.

Process step 201. The input audio 300 is received from the application 101. This input audio 300 is received as the user speaks into the IVR.

Process step 202. The input audio 300 is segmented into successive time frames.

Process step 203. The volume for each frame is calculated by the volume analyzer 102. The input audio 300 is received by the volume analyzer 102 and the current volume 302 is output to the loudness classifier 103. The loudness classifier 103 receives the current volume 300 and this is stored in a volume control 304, if greater than the previous value.

Process step 204. At the same time, the input audio 300 and grammar definition file 306 are submitted to the ASR 104 which returns results as a keyword 308 and an associated confidence value 310.

Process step 205. The confidence value 310 is analyzed by the confidence classifier 105 and a confidence category tag 312 is output.

Process step 206. The output typer 106 selects a prompt 314 to match, add to, or replace, the keyword 308 based on the confidence category tag 312.

Process step 207. The output scheduler 107 passes an alert 316 together with the prompt and keyword to the prompt generator 108 for immediate conversion to output audio 318. Alternatively it suppresses and does not send the prompt 314 or keyword 308. The decision is based on the confidence category tag 312 and previous alerts or suppressions as explained in the description of the output scheduler 107.

Process step 208. Output audio 318 is generated if the alert 316 is received by the prompt generator 108. The output audio 318 is generated from the keyword 308 and prompt 314 by extracting corresponding pre-recorded prompts or via text-to-speech synthesis.

Process step 209. The output audio 318 is played out to the user modified by the gain control 109. The modification is based on the volume control 304 and played out to the user such that it is louder, the same as, or quieter than the volume of the input audio 300.

DESCRIPTION OF AN ALTERNATIVE EMBODIMENT

By way of illustration, FIG. 4 summarizes an alternate approach to the preferred embodiment. Although advanced speech recognition technology currently exists allowing the conversion of continuous audio into standard text, in the preferred embodiment the output typer 106 and output scheduler 107 are responsible for determining the importance of the recognition result for the automated service and, using the confidence value, deciding on how and when to generate audio feedback for the user.

In the alternate embodiment, two new components are introduced: natural language understanding unit (NLU) 405 and the associated dialogue manager 411. Other components are treated as substantially the same as in the preferred embodiment and are referenced for ease of explanation to the corresponding feature in FIG. 1 and the description. The recognizer 404 does not use a predefined grammar definition file, but instead, simply converts the audio input into a sequence of recognized sounds. The NLU 405 parses this sequence to determine the user's intention. In the example used above, the NLU 405 would identify the starting location and destination, as well as converting the associated time definition ("next Tuesday") into an appropriate date. Thus, the NLU 405 would separate the text into information units, which previously could only be triggered by labels or tags used to annotate items within the grammar definition file.

The dialogue manager 408 in such an environment tracks how far the automated service has progressed: which items required to complete the service have already been understood and which are outstanding. The dialogue manager 408 therefore would assume responsibility for scheduling output to the caller: each time an item required by the service is completed, it would alert the other components that a prompt can be played out to the caller, in much the same way as the output scheduler 107 does above. The output scheduler now simply needs to track the type of output to be played (definite or optional turn-take or place-marker), and determine whether to suppress the output.

The introduction of NLU 405 and a dialogue manager 408 therefore simplifies the processing within individual steps of the preferred embodiment, but without substantially altering the overall invention.

In another embodiment, the application would not include the automated service but could act as an IVR client to an automated service server. The IVR environment does not need to be a telephony IVR, but could be any speech-enabled application on a PC, PDA or mobile phone. The automated service controlled by the application does not need to be a flight enquiry, but any automated service where the user provides input via speech and is prompted via audio output. The IVR may alternately connect to a telephony environment using a Voice over Internet Protocol (VoIP).

In summary there is described a method and apparatus for generating appropriate confirmatory prompts in a speech-enabled, interactive computer system. A method of providing acknowledgement prompts in an interactive voice response system can comprise: receiving an input audio stream over a voice channel from a user; performing keyword recognition on received elements of the input audio stream; and prompting the user with an acknowledgement of recognized received elements whilst continuing to receive the input audio stream.

According to another aspect of the method, the volume of the speech input can be continuously monitored. In a further aspect of the method, recognition results and associated confidence values are combined to select different confirmatory prompts, and the volume is tailored to be the same as, louder than or quieter than the volume of the speech input, so that different types of confirmation can be automatically generated to produce a natural speech-enabled interface.

What is claimed is:

1. A method of providing acknowledgement prompts in an interactive voice response system (IVR) comprising:
   receiving an input audio stream over a voice channel from a user;
   analyzing elements of the input audio stream by a speech recognition system for identifying a keyword and an associated confidence value;
   determining a confidence category based on the identified confidence value;
   selecting a suitable acknowledgement prompt associated with the determined confidence category;
   while analyzing elements of the input audio stream by the speech recognition system, analyzing elements of the input audio stream by a volume analyzer for determining a current volume;
   selecting a suitable output volume for the selected acknowledgement prompt based on the determined confidence category and the current volume; and
   outputting to the user the selected acknowledgement prompt at the selected output volume whilst continuing to receive the input audio stream.

2. The method according to claim 1 wherein the voice channel is a full duplex voice channel between a user telephone and an IVR whereby the acknowledgement is played out over the same full duplex voice channel as the input audio stream is being received.

3. The method according to claim 1 wherein for a high confidence value, the form of the confirmation is a "place-marker" prompt.

4. The method according to claim 1 wherein for a medium confidence value, the form of the acknowledgement is an "optional turn-take" prompt plus the identified keyword.

5. The method according to claim 1 wherein for a low confidence value, the form of the acknowledgement is a "definite turn-take" prompt and optionally the identified keyword.

6. The method according to claim 1 further comprising playing out the acknowledgement prompt at the output volume and modifying the output volume prior to being played out.

7. The method according to claim 6 wherein the output volume for the acknowledgement prompt is modified according to the confidence value associated with recognition.

8. The method according to claim 7 wherein the output volume is matched to an input volume or slightly reduced for ambiguous recognition results.

9. The method according to claim 7 wherein the output volume is modified to be louder than an input volume for low confidence recognition results.

10. The method according to claim 7 wherein the output volume is modified to be quieter than an input volume for high confidence recognition results.

* * * * *